Oct. 22, 1929.  M. P. WETMORE  1,732,783
MACHINE FOR USE IN THE MANUFACTURE OF DOUBLE WALLED VACUUM BOTTLES
Original Filed July 30, 1927  3 Sheets-Sheet 1
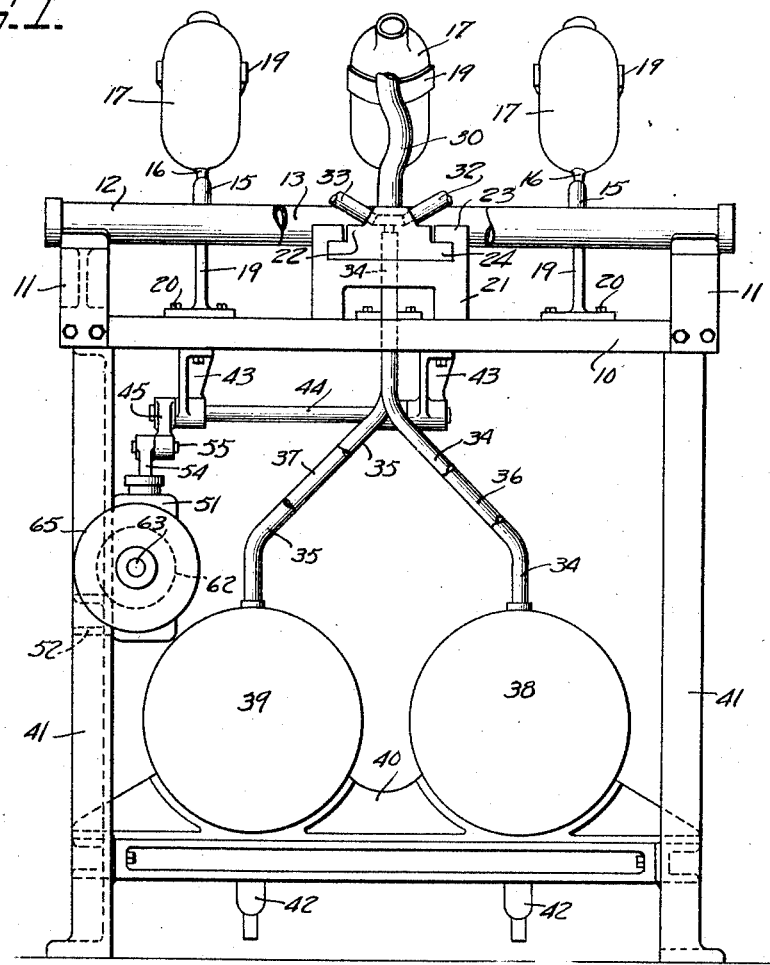
INVENTOR
Miner P. Wetmore
BY
Adolph E. Thomas
ATTORNEY Oct. 22, 1929. M. P. WETMORE 1,732,783
MACHINE FOR USE IN THE MANUFACTURE OF DOUBLE WALLED VACUUM BOTTLES
Original Filed July 30, 1927   3 Sheets-Sheet 2
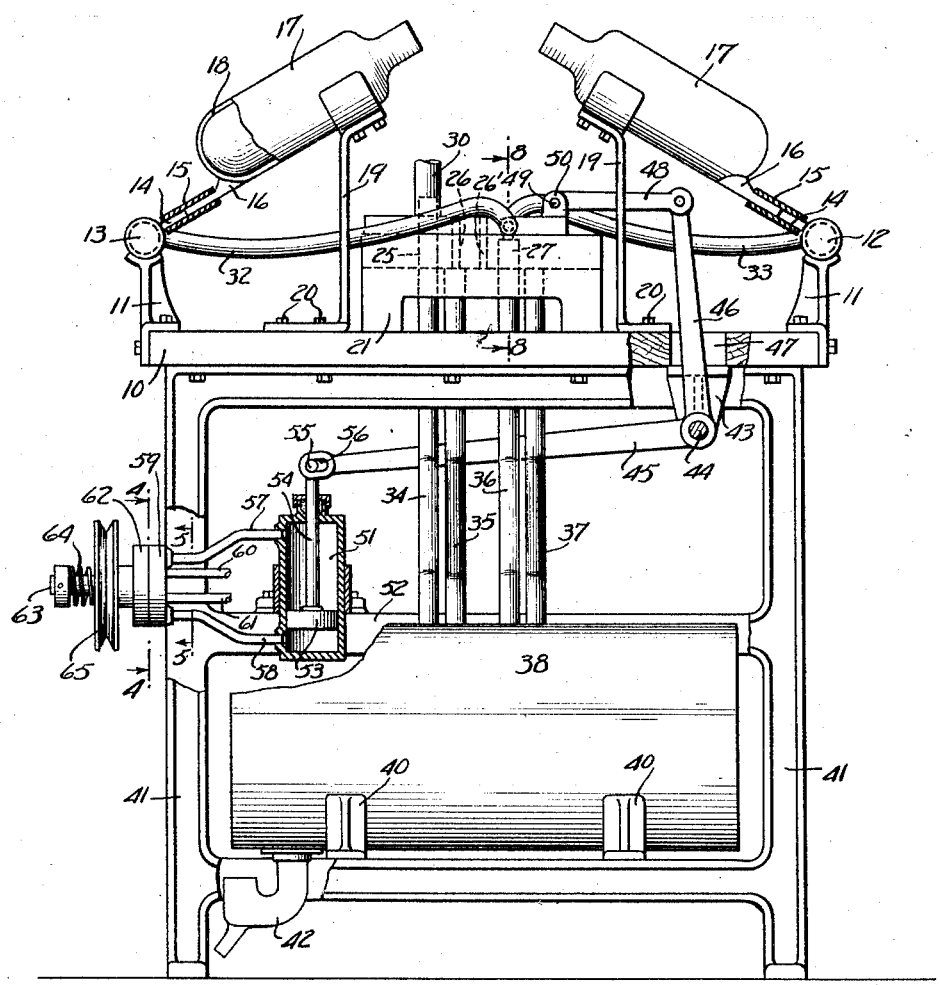
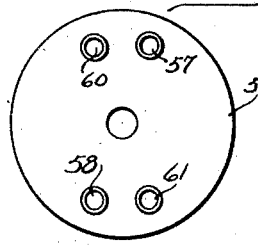
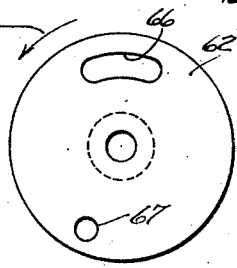
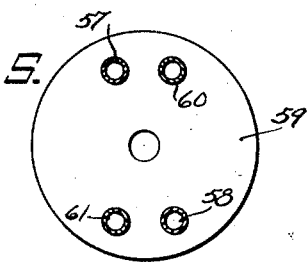
INVENTOR
Miner P. Wetmore
BY
Adolph A. Thomas
ATTORNEY

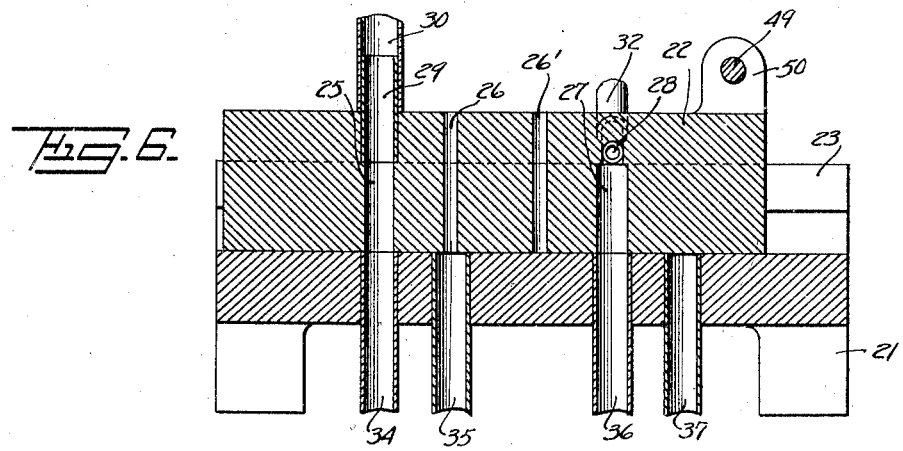
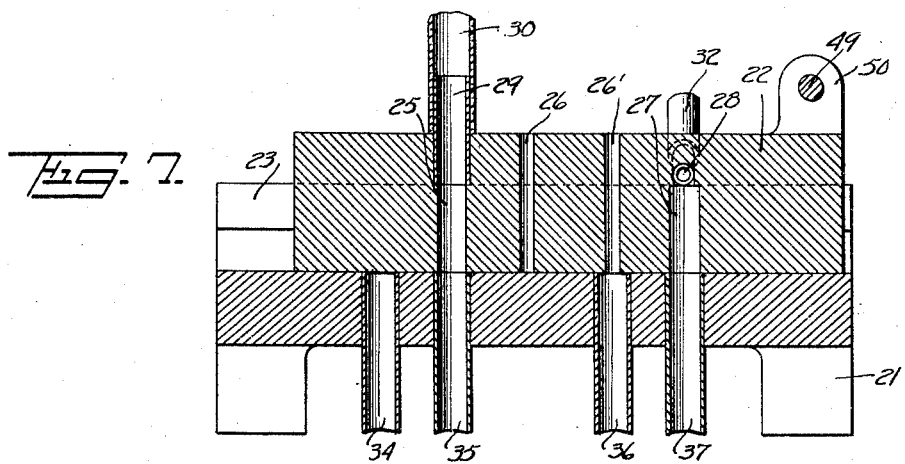
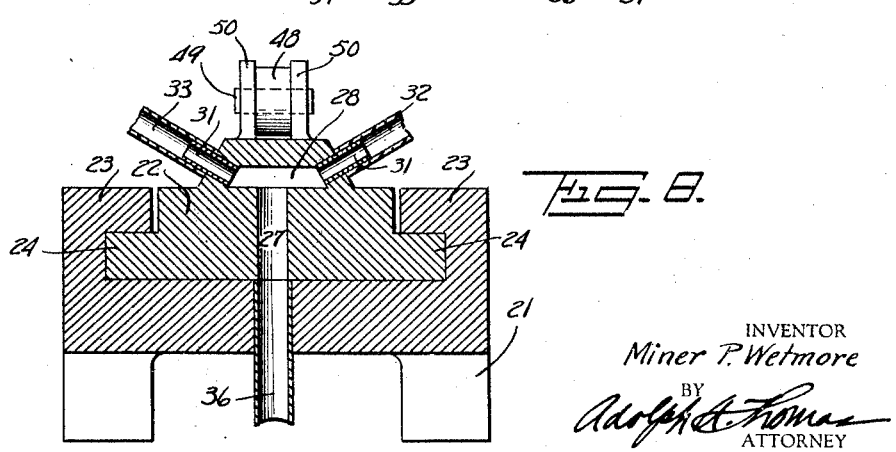

Patented Oct. 22, 1929

1,732,783

UNITED STATES PATENT OFFICE

MINER P. WETMORE, OF NORWICH, CONNECTICUT, ASSIGNOR TO AMERICAN THERMOS BOTTLE COMPANY, OF NORWICH, CONNECTICUT, A CORPORATION OF OHIO

MACHINE FOR USE IN THE MANUFACTURE OF DOUBLE-WALLED VACUUM BOTTLES

Application filed July 30, 1927, Serial No. 209,607. Renewed March 16, 1929.

My invention is for new and improved apparatus for quickly and efficiently drawing water or other liquid from the vacuum chamber of double-walled vacuum bottles. In the manufacture of these receptacles, it is customary to silver the inner walls of the annular vacuum chamber that separates the two glass cylinders. In one form of silvering process, a coating of metallic silver is precipitated from a silver solution on the glass walls of the vacuum chamber. At a certain stage of this process, the silvered bottle is rinsed with water, which must be extracted from the vacuum chamber before the bottle is put in an oven to fix the silver coating. It is the object of my invention to provide a machine for speedily emptying the vacuum chambers of their water contents as completely as possible.

In a machine that I have actually built in accordance with my invention, a number of bottles containing water in the vacuum chamber are supported at the same time and connected with a vacuum pump for drawing off the water. There are two tanks for receiving the extracted water. An intermittently actuated valve controls the vacuum connections in such a way that, while one tank is filling, the other is draining, so that the operation of the machine is continuous. In a preferred embodiment of my invention, I utilize the suction of the vacuum pump to operate the valve at predetermined intervals. For this purpose I employ a small cylinder having a piston connected with the valve. The cylinder communicates with the vacuum pump and also with the atmosphere at opposite sides of the piston. These communications are controlled by a separate valve so that the piston is actuated at certain intervals to operate the tank-controlling valve, as will more fully appear later on.

I can best explain my invention by reference to the accompanying drawings, in which—

Fig. 1 is a side elevation (looking from left to right of Fig. 3) of a machine actually constructed in accordance with my invention;

Fig. 2 represents a plan view of the machine, with parts broken away for lack of space;

Fig. 3 is a side view looking from right to left of Fig. 1;

Fig. 4 is a diagrammatic face view of the piston-controlling valve in disassembled form, approximately as seen on line 4—4 of Fig. 3;

Fig. 5 is a detail view taken on section line 5—5 of Fig. 3;

Fig. 6 shows an enlarged longitudinal cross-section of the slidable tank-controlling valve, which is in position to connect one of the tanks with the vacuum pump;

Fig. 7 is a view similar to Fig. 6, with the valve in position to connect the other tank with the vacuum pump; and Fig. 8 is an enlarged cross-sectional view on line 8—8 of Fig. 3.

At opposite sides of table 10 are fixed brackets 11 for supporting a pair of pipes 12 and 13. Each pipe is provided with one or more nipples 14 on which are mounted rubber tubes 15 adapted to receive the tubular extensions 16 of double-walled vacuum bottles 17. It is well known that bottles of this type consist of an inner and an outer cylinder of glass united at the top and spaced by an annular chamber 18, which is evacuated to provide a heat-insulating medium in the finished product. The tubular extension 16 communicates with the vacuum chamber 18. The rubber tubing 15 is such that an airtight fit is established when the tubular extension 16 of the bottle is inserted. Each bottle is supported in proper position by resting on a suitable bracket 19 secured to the table 10 by bolts 20 or in any other practical way.

A block or casting 21 is secured on table 10, and on this block is mounted a slide valve 22. The block 21 is formed with overhanging slide flanges 23 arranged to form grooves or channels for receiving the lateral extensions 24 of slide valve 22, whereby the latter is guided in its reciprocating movements on block 21. The valve 22 is provided with vertical ports 25, 26, 26' and 27. A lateral port 28 communicates with port 27. In port 25 is fixed a pipe 29 adapted to receive the end of a flexible tube 30 in an airtight fit. The tube 30 is suitably suspended over the table and is supposed to be connected with a vacuum pump. The passages 26 and 26' are air vents for a purpose that will presently appear. In the opposite ends of the lateral port 28 are inserted pipes 31 to which are connected rubber tubes 32 and 33. The other ends of these tubes are attached to pipes 12 and 13, respectively.

Below the table 10 are four pipes 34, 35, 36 and 37, which lead into the fixed block or valve seat 21 and are arranged to cooperate with the valve ports 25, 26, 26' and 27 in a manner that will be explained in due course. The pipes 34 and 36 lead to a tank 38, while the pipes 35 and 37 lead to a tank 39. The tanks 38 and 39 are supported below the table on a cradle or frame 40 mounted between the table legs 41. Each tank is provided at the bottom with an outlet or drain pipe 42, which is controlled by a suitable check-valve not necessary to show or describe.

Below the table 10 are suspended two brackets 43 for supporting a shaft 44. To one end of shaft 44 is connected a horizontal lever 45, and to the other end of the shaft is secured a vertical lever 46 which extends through an opening 47 in the table. The levers 45 and 46 constitute in effect a bell-crank. To the upper end of lever 46 is pivoted a link 48 adapted to hook over or otherwise engage a pin 49 carried by a pair of spaced lugs 50 on slide valve 22. It is clear that, as the arm or lever 45 is rocked up and down about its pivot 44, the link 48 moves back and forth to reciprocate the valve 22 on its seat 21. In the broad view of my invention, any practical means may be employed to rock the lever 45 up and down at predetermined intervals, but I prefer to utilize the vacuum pump for that purpose. A small cylinder 51 is suitably supported below the table, as by mounting it in vertical position on a cross-piece 52 attached to the table legs 41. In cylinder 51 operates a piston 53, which is connected to the free end of lever 45 through the piston rod 54 in any practical way, as by a cross-pin 55 on the piston rod engaging in the slotted end 56 of the lever. The opposite ends of cylinder 51 communicate through pipes 57 and 58 with a stationary valve member 59 mounted near the cylinder. Pipes 60 and 61 lead from valve member 59 to the vacuum pump through connections which need not be shown or described. For convenience, the pipes or passages 57 and 58 may be referred to as the cylinder ports of valve 59, and the pipes 60 and 61 may be called the vacuum ports. These valve ports are controlled by a rotary disk 62 mounted on a shaft 63 and held in airtight contact with valve member 59 by a coil spring 64. The rotary valve disk 62 is operated by a pulley 65 driven at proper speed from any suitable source of power. The valve disk 62 is provided with a recess or chamber 66 arranged to connect either pair of ports 57—60 and 58—61 at proper intervals. An air vent 67 is so arranged in valve disk 62 that, when the ports 57 and 60 are connected by passage 66, the cylinder port 58 is open to the atmosphere through vent 67. When the ports 58 and 61 are uncovered by passage 66, the air vent 67 is in line with port or pipe 57 to open the connected portion of the cylinder 51 to the outer air.

Let us suppose that the piston 53 is at the bottom of its stroke, as shown in Fig. 3. At that moment, the parts 57 and 60 are connected by valve passage 66, and the cylinder port 58 is open to the atmosphere through vent 67. Consequently, the lower portion of cylinder 51 is open to the air and the upper portion is connected with the vacuum pump. The result is that the piston 53 is pushed or drawn up in the cylinder, thereby rocking the arm 45 upwardly. As the valve disk 62 continues to rotate in the direction of the arrow in Fig. 4, communication between the ports 57 and 60 is interrupted and the piston 53 remains at the top of its stroke until the passage 66 uncovers the ports 58 and 61. When that happens, the top of the cylinder is open to the atmosphere through air vent 67 and the lower portion of the cylinder is connected to the vacuum pump. The piston 53 is therefore pulled or pushed down until it reaches the bottom of its stroke, as shown in Fig. 3. The downward movement of piston 53 pulls down the lever 45. It will thus be seen that the slow continuous rotation of valve 62 produces sudden intermittent movements of lever 45. In the particular machine that I have constructed, the valve disk 62 makes one revolution every four minutes, so that the piston 53 is actuated every two minutes.

Let us now see what happens to the slide valve 22 as the lever 45 is rocked up and down. When the piston 53 is in its down position, the valve 22 is in the position shown in Fig. 6 and establishes the following connections: The vacuum port 25 is in line with pipe 34 and tank 38 is connected with the vacuum pump. The port 27 is in line with pipe 36 which leads to tank 38. Consequently, pipes 12 and 13 are open to tank 38 and the vacuum pump. The supported bottles 17 being thus open to the vacuum pump, the water or other liquid in the vacuum chambers 18 of the bottles is drawn off through tubes 32 and 33, through valve ports 28 and 27, and through pipe 36 into tank 38. While the contents of the bottles are being thus discharged into tank 38, the other tank 39 is open to the atmosphere through air vent 26, which is in line with pipe 35. This allows the tank 39 to drain through the check-valve in outlet 42. When either of the tanks is connected to the vacuum pump, the check-valve automatically closes the outlet of the tank, so that the vacuum may perform its drawing-off function. This will be clear without further explanation.

When the lever 45 is pushed up by the piston 53, the slide valve 22 is shifted toward the left to the position shown in Fig. 7. The vacuum port 25 is now in line with pipe 35, the port 27 is in line with pipe 37, and the air vent 26' connects with pipe 36 of tank 38. This means that the bottles connected to pipes 12 and 13 are now in communication with the vacuum pump through pipes 35 and 37, so that the drawn-off water runs into tank 39. While this tank is filling, tank 38 (now open to the atmosphere) is automatically draining through the valve-controlled outlet 42.

It will be clear from this description that the bottles 17 are alternately connected to tanks 38 and 39, and that, while one tank is filling, the other tank is draining. It goes without saying that the tanks drain faster than they fill. The particular machine shown in the drawings empties six bottles at a time. It takes only a few seconds to draw off the water. Two attendants, one at each side of the machine, can handle forty-eight bottles every two minutes, which is the interval between the movements of slide valve 22. About three gallons of water are drawn off into either tank every two minutes. The capacity of each tank is about five gallons, so that a tank is never more than three-fifths full before its begins to drain. I need hardly add that these figures are given merely as illustrations and not in a restrictive sense.

Although I have shown and described a specific construction, I want it understood that my invention is not limited to the details set forth. Changes and modifications will doubtless occur to others in building machines under my patent without departing from the scope of the invention as defined in the claims.

I claim as my invention:

1. In a machine for emptying bottles containing liquid, means for connecting a plurality of bottles with a source of vacuum to draw off the liquid contents of said bottles, said connecting means including at least two tanks for receiving the drawn-off liquid, and automatic means for periodically connecting the vacuum and bottles with only one tank at a time, so that one tank is filling while the other is draining.

2. In a machine of the class described, means for supporting a plurality of bottles containing liquid, a pair of tanks adapted to be connected with a source of vacuum, means for connecting said bottles with said source of vacuum to draw the liquid contents of said bottles into the tanks, said connecting means including an intermittently operated valve to connect said tanks alternately with the vacuum, whereby one tank is filling while the other is draining, and means for automatically actuating said valve at predetermined intervals.

3. In a machine of the class described, means for supporting a plurality of bottles containing liquid, a pair of tanks adapted to be connected with a source of vacuum, means for connecting said bottles with said source of vacuum to draw the liquid contents of said bottles into the tanks, said connecting means including a valve to connect said tanks alternately with the vacuum, whereby one tank is filling while the other is draining, and mechanism controlled by said source of vacuum for operating said valve at predetermined intervals.

4. In a machine of the class described, a pipe having means for connecting the same with bottles containing liquid, a pair of tanks, a valve having means for connecting said tanks alternately with a source of vacuum and the atmosphere, said valve having a port arranged to connect with the tank that is open to the vacuum, tubing for connecting said valve port with said pipe, whereby the liquid contents of the bottles are drawn off by the vacuum into the connected tank, and automatic means for operating said valve at certain intervals to allow one tank to fill and the other tank to drain.

5. In a machine of the class described, a pipe adapted to be connected with bottles containing liquid, a pair of tanks, a valve having means for connecting said tanks alternately with a source of vacuum and the atmosphere, said valve having a port arranged to connect with the tank that is open to the vacuum, tubing for connecting said valve port with said pipe, whereby the liquid contents of the bottles are drawn off by the vacuum into the connected tank, a lever for operating said valve to allow one tank to fill and the other tank to drain, and pneumatic mechanism for actuating said lever at certain intervals.

6. In a machine of the class described, a pipe having means for connecting the same with bottles containing liquid, a pair of tanks, a valve having means for connecting said tanks alternately with a source of vacuum and the atmosphere, said valve having a port arranged to connect with the tank that is open to the vacuum, tubing for connecting said valve port with said pipe, whereby the liquid contents of the bottles are drawn off by the vacuum into the connected tank, and mechanism controlled by said source of vacuum for operating said valve at predetermined intervals to allow one tank to fill and the other tank to drain.

7. In a machine of the class described, means for supporting a plurality of bottles containing liquid, a pair of tanks adapted to be connected with a source of vacuum, means for connecting said bottles with said source of vacuum to draw the liquid contents of said bottles into the tanks, said connecting means including a valve to connect said tanks alternately with the source of vacuum, whereby one tank is filling while the other is draining, a lever for intermittently actuating said valve to shift the tank connections, pneumatic mechanism for operating said lever, and a timed valve for controlling said mechanism to operate said valve at predetermined intervals.

8. In a machine of the class described, a pipe having means for connecting the same with bottles containing liquid, a pair of tanks, a valve having means for connecting said tanks alternately with a source of vacuum and the atmosphere, said valve having a port arranged to connect with the tank that is open to the vacuum, tubing for connecting said valve port with said pipe, whereby the liquid contents of the bottles are drawn off by the vacuum into the connected tank, a lever for actuating said valve periodically to allow one tank to fill and the other tank to drain, and pneumatic mechanism controlled by said source of vacuum to operate said lever at predetermined intervals.

9. In a machine of the class described, means for supporting a plurality of bottles containing liquid, a pair of tanks adapted to be connected with a source of vacuum, means for connecting said bottles with said source of vacuum to draw the liquid contents of said bottles into the tanks, said connecting means including a valve to connect said tanks alternately with the vacuum and the atmosphere, whereby one tank is filling while the other is draining, a lever for actuating said valve to shift the tank connections, a cylinder having a piston connected to said lever, means for connecting the opposite ends of said cylinder with the vacuum and the atmosphere, and a timed valve for so controlling said last-named connections that when one side of the piston is open to atmospheric pressure the other side of the piston connects with the vacuum, whereby said piston is periodically actuated in opposite directions to operate said lever.

10. In a machine of the class described, a pipe having means for connecting the same with bottles containing liquid, a pair of tanks, a slide valve having means for connecting said tanks alternately with a source of vacuum and the atmosphere, said valve having a port arranged to connect with the tank that is open to the vacuum, tubing for connecting said valve port with said pipe, whereby the liquid contents of the bottles are drawn off by the vacuum into the connected tank, a lever for sliding said valve periodically to allow one tank to fill and the other tank to drain, a cylinder having a piston connected to said lever, means for connecting the opposite ends of said cylinder with said source of vacuum and the atmosphere, and a timed valve for so controlling said last-named connections that when one side of the piston is open to atmospheric pressure the other side of the piston connects with the vacuum, whereby said piston is periodically actuated in opposite directions to operate said lever.

MINER P. WETMORE.